US012337707B2

United States Patent
Yoon et al.

(10) Patent No.: US 12,337,707 B2
(45) Date of Patent: Jun. 24, 2025

(54) METHOD AND COMMUNICATION SYSTEM FOR DISTRIBUTED CONTROL OF DYNAMIC WIRELESS POWER TRANSFER FOR ELECTRIC VEHICLE

(71) Applicant: KAIST (Korea Advanced Institute of Science and Technology), Daejeon (KR)

(72) Inventors: Uoo Yeol Yoon, Daejeon (KR); Dong Ho Cho, Daejeon (KR)

(73) Assignee: KAIST (KOREA ADVANCED INSTITUTE OF SCIENCE AND TECHNOLOGY), Daejeon (KR)

( * ) Notice: Subject to any disclaimer, the term of this patent is extended or adjusted under 35 U.S.C. 154(b) by 651 days.

(21) Appl. No.: 17/718,510

(22) Filed: Apr. 12, 2022

(65) Prior Publication Data

US 2023/0322100 A1 Oct. 12, 2023

(51) Int. Cl.
*B60L 53/126* (2019.01)
*B60L 53/66* (2019.01)

(52) U.S. Cl.
CPC ............. *B60L 53/126* (2019.02); *B60L 53/66* (2019.02)

(58) Field of Classification Search
CPC ......... B60L 53/126; B60L 53/66; B60L 53/32
See application file for complete search history.

(56) References Cited

U.S. PATENT DOCUMENTS

| 2017/0136908 A1* | 5/2017 | Ricci | B60L 53/32 |
| 2022/0294277 A1* | 9/2022 | Wolgemuth | B60L 53/126 |

\* cited by examiner

*Primary Examiner* — David V Henze-Gongola
(74) *Attorney, Agent, or Firm* — LEX IP MEISTER, PLLC

(57) ABSTRACT

A Distributed control method and a distributed communication system for wireless charging of an electric vehicle in moving are provided. For electric vehicle moving on roads in which segmented power supply lines are buried, wireless charging is provided by controlling the switching of power supply segments in real time using a mobile communication system. A distributed communication system controls such process.

Since the switching of the power supply segment is distributed and controlled in real time by using a mobile communication system, continuous and stable wireless charging can be achieved without interruption of charging for an electric vehicle in moving.

22 Claims, 9 Drawing Sheets

METHOD AND COMMUNICATION SYSTEM FOR DISTRIBUTED CONTROL OF DYNAMIC WIRELESS POWER TRANSFER FOR ELECTRIC VEHICLE

BACKGROUND OF THE INVENTION

1. Field of the Invention

The present invention relates to a distributed control method and a distributed communication system for dynamic wireless charging of an electric vehicle, and more particularly, to a method of providing charging by distributed controlling the switching of a power supply segment in real time using a mobile communication system for an electric vehicle moving on a road in which a segmented power supply line is buried, and also to a distributed communication system for the same.

2. Description of the Related Art

Wireless charging for an electric vehicle in a stationary state is performed between the charger and the electric vehicle based on Wi-Fi communication in a limited place. In the case of wireless charging for an electric vehicle in motion, Wi-Fi communication cannot be used because wireless charging must be performed in a wide area while moving. In addition, the charging method using Wi-Fi communication has a problem in that it cannot be applied to real-time ON-OFF control of a power supply segment due to a time delay characteristic.

PRIOR ART LITERATURE

Patent Literature (Patent Document 1) KR10-1332792 B1

SUMMARY OF THE INVENTION

The present invention has been devised to solve such problems and an object of the present invention is to provide a distributed control method that enables continuous and stable wireless charging without interruption for an electric vehicle in motion by controlling the switching of the power supply segment in real time using a mobile communication system and also to provide a distributed communication system for the same.

In order to achieve the above object, there is provided a distributed control and distributed communication system for dynamic wireless charging of an electric vehicle, comprising: a dynamic wireless charging power supply equipment communication controller (hereinafter, 'power supply equipment communication controller') for communicating with a distributed dynamic wireless charging mobility manager (hereinafter, 'distributed mobility manager') and with a wireless charging electric vehicle communication controller (hereinafter, 'electric vehicle communication controller') installed in the electric vehicle, and for controlling power transfer from a power supply segment to the electric vehicle by controlling an inverter connected to the power supply segment when switching according to power handover; and, a distributed mobility manager for controlling power handover between the power supply equipment communication controller and other power supply equipment communication controllers by interoperating with the power supply equipment communication controller; wherein a plurality of the power supply equipment communication controller are installed along the power supply line, wherein a plurality of the distributed mobility manager are installed along the power supply line, and wherein, between each of the distributed mobility managers, message transmission and reception for power handover is performed.

The power supply equipment communication controller may perform the functions of: receiving, when power handover request information is transferred to another power supply equipment communication controller (hereinafter, 'second power supply equipment communication controller') in response to a power handover request, a location information of the electric vehicle from the electric vehicle communication controller mounted on the electric vehicle that is being charged while driving in the power supply segment managed by the power supply equipment communication controller, and providing the location information to the distributed mobility manager interoperating with the power supply equipment communication controller; providing, when the second power supply equipment communication controller information that has received the power handover request information is received from the distributed mobility manager, the second power supply equipment communication controller information to the electric vehicle communication controller; and, controlling, when a message is received from the distributed mobility manager notifying that the power supply segment has been changed to a management area of the second power supply equipment communication controller by power handover, the power supply segment to stop power transfer to the electric vehicle and transmitting a corresponding change notification to the electric vehicle communication controller.

In the case of receiving power handover request information from another power supply equipment communication controller (hereinafter, 'third power supply equipment communication controller') in response to a power handover request, the power supply equipment communication controller may further performs the functions of: receiving a power handover instruction including the power handover request information from a distributed mobility manager interoperating with the power supply equipment communication controller; receiving a request for registration of the electric vehicle communication controller from the electric vehicle communication controller mounted on the electric vehicle to receive power transfer, and, after approving the request, controlling a power supply segment to start transferring power to the electric vehicle; and, sending a response message informing that the electric vehicle communication controller has been registered to the distributed mobility manager interoperating with the power supply equipment communication controller.

When the power supply device communication controller interoperating with the distributed mobility manager transfers power handover request information to another power supply device communication controller (hereinafter, 'second power supply equipment communication controller') interoperating with another distributed mobility manager (hereinafter, 'second distributed mobility manager') by power handover, the distributed mobility manager may perform the functions of: sending, when it is determined that power handover to a power supply segment managed by the second power supply equipment communication controller is required from the location information of the electric vehicle received from the power supply equipment communication controller, the power handover request to the second distributed mobility manager; receiving, from the second distributed mobility manager, information on the second power supply equipment communication controller that has received the power handover request information, and transmitting the same to the power supply equipment communication controller; and, receiving a message from the second distributed mobility manager notifying that the power supply segment has been changed to a management area of the second power supply equipment communication controller by power handover, controlling the power supply segment to stop power transfer to the electric vehicle, and transmitting the corresponding change notification to the power supply equipment communication controller.

When the power supply device communication controller interoperating with the distributed mobility manager receives power handover request information from another power supply device communication controller (hereinafter, 'third power supply equipment communication controller') interoperating with another distributed mobility manager (hereinafter, 'third distributed mobility manager') according to a power handover request, the distributed mobility manager may further perform the functions of: controlling a power supply segment to initiate power transfer to the corresponding electric vehicle upon receiving the power handover request from the third distributed mobility manager; transmitting a power handover instruction including power handover request information to the power supply equipment communication controller; transmitting the power supply equipment communication controller information to the third distributed mobility manager; and, transmitting to the third distributed mobility manager, when receiving a response message from the power supply equipment communication controller indicating that the electric vehicle communication controller mounted on the electric vehicle to receive power has been registered, a message informing that the power delivery segment has been changed to the management area of the power supply equipment communication controller due to power handover.

Preferably, the distributed mobility manager further includes a function of: sharing between adjacent distributed mobility managers information on the electric vehicle communication controller of the electric vehicle currently being charged and the communication controller information of the power supply equipment that is charging the electric vehicle.

The system may further comprise a location mobility manager including the functions of: registering, after the electric vehicle is powered on, the location of the electric vehicle; tracking the location of the electric vehicle while moving until the electric vehicle enters a power supply segment; and, transmitting, when the electric vehicle approaches a specific power supply segment, registration information including electric vehicle communication controller information and the location information of the electric vehicle to the distributed mobility manager corresponding to the power supply segment.

According to other aspect of the present invention, there is provided a method for performing communication for power handover by a dynamic wireless charging power supply equipment communication controller (hereinafter, 'power supply equipment communication controller'), comprising the steps of: (a) receiving, by the power supply equipment communication controller, location information of an electric vehicle from a dynamic wireless charging electric vehicle communication controller (hereinafter, 'electric vehicle communication controller') mounted on the electric vehicle receiving wireless charging while driving from a power supply segment, and providing the location information to a distributed mobility manager; (b) providing, in case of receiving other power supply equipment communication controller information (hereinafter 'second power supply equipment communication controller') that has received power handover request information from the distributed mobility manager, the said information to the electric vehicle communication controller; and, (c) controlling, when receiving a message from the distributed mobility manager notifying that the power supply segment has been changed to a management area of the second power supply equipment communication controller due to power handover, the power supply segment to stop power transfer to the electric vehicle, and transmitting a corresponding change notification to the electric vehicle communication controller.

The method may further comprise the steps of: (e) receiving, when the power supply equipment communication controller receives power handover request information from another power supply equipment communication controller (hereinafter, 'third power supply equipment communication controller') in response to a power handover request, a power handover instruction including the power handover request information from a distributed mobility manager; (f) receiving, from the electric vehicle communication controller mounted on the electric vehicle to receive power transfer, a registration request of the corresponding electric vehicle communication controller; (g) controlling the power supply segment to start power transfer to the corresponding electric vehicle after approving the registration request; (h) transmitting a response message notifying that the electric vehicle communication controller has been registered to the distributed mobility manager.

Preferably, the location information of the electric vehicle received in the step (a) is information identified by the GPS device of the electric vehicle or information received by the electric vehicle communication controller from the power supply line location information providing unit installed on the power supply line.

The method may further comprise, before the step (a), steps of: (a01) receiving, when the electric vehicle moves from a non-power supply area to a power supply area of the power supply equipment communication controller and the distributed mobility manager interoperating therewith, location registration information for the electric vehicle from a first distributed mobility manager; and, (a02) controlling the power supply segment to start power transfer to the electric vehicle.

According to another aspect of the present invention, there is provided a method for controlling, by a distributed dynamic wireless charging mobility manager (hereinafter, 'distributed mobility manager'), power handover information transmission between a power supply equipment communication controller interoperating with the distributed mobility manager and another power supply equipment communication controller, the method comprising the steps of: (a) receiving, by the distributed mobility manager, location information of an electric vehicle being wirelessly charged from the power supply equipment communication controller; (b) sending, if it is determined from the location information that it is necessary to perform power handover to a power supply segment managed by another power supply equipment communication controller (hereinafter, 'second power supply equipment communication controller') interoperating with another distributed mobility manager (hereinafter, 'second distributed mobility manager'), a power handover request to the second distributed mobility manager; (c) receiving, from the second distributed mobility manager, information on the second power supply equipment communication controller that has received the power handover request information; (d) transmitting information of the second power supply equipment communication controller to the power supply equipment communication controller; and, (e) controlling, when receiving a message from the second distributed mobility manager notifying that the power supply segment is changed to a management area of the second power supply equipment communication controller due to power handover, the power supply segment to stop power transmission to the electric vehicle and transmitting a corresponding change notification to the power supply equipment communication controller.

The method may further comprise the steps of: (g) receiving, when the power supply device communication controller interoperating with the distributed mobility manager receives power handover request information from another power supply device communication controller (hereinafter, 'third power supply equipment communication controller') interoperating with another distributed mobility manager (hereinafter, 'third distributed mobility manager') by power handover request, a power handover request including the power handover request information from the third distributed mobility manager; (h) controlling the power supply segment to start power transfer to the corresponding electric vehicle; (i) transmitting a power handover instruction including the power handover request information to the power supply equipment communication controller; (j) transmitting power supply equipment communication controller information to the third distributed mobility manager; and, (k) transmitting to the third distributed mobility manager, when receiving a response message from the power supply equipment communication controller indicating that the electric vehicle communication controller installed in the electric vehicle to receive power is registered, a message informing that the power delivery power segment has been changed to the management area of the power supply equipment communication controller by power handover.

Before the step (a), the method may further comprise the steps of: (a01) receiving, when the electric vehicle enters a power supply area of the distributed mobility manager and the power supply equipment communication controller from a non-powered area, location registration information for the electric vehicle from a location mobility manager; and, (a02) transmitting the location registration information to the first power supply equipment communication controller.

According to still another aspect of the present invention, there is provided a distributed control and distributed communication method for wireless charging of an electric vehicle in moving, comprising the steps of: (a) receiving, by a power supply equipment communication controller (hereinafter, 'first power supply equipment communication controller'), location information of the electric vehicle from an electric vehicle communication controller mounted on the electric vehicle in a power supply segment and providing the location information to a distributed mobility manager (hereinafter, 'first distributed mobility manager') interoperating with the first power supply equipment communication controller; (b) sending, when the first distributed mobility manager determines from the location information that it is necessary to perform power handover to a power supply segment managed by another power supply equipment communication controller (hereinafter, 'second power supply equipment communication controller') interoperating with another distributed mobility manager (hereinafter, 'second distributed mobility manager'), a power handover request to the second distributed mobility manager; (c) transmitting, by the second distributed mobility manager, a power handover instruction including power handover request information to the second power supply equipment communication controller; (d) transmitting, by the second distributed mobility manager, the second power supply equipment communication controller information to the first distributed mobility manager; (e) transmitting, by the first distributed mobility manager, the second power supply device communication controller information to the first power supply device communication controller; (f) providing, by the first power supply equipment communication controller, the second power supply equipment communication controller information to the electric vehicle communication controller; (g) approving, when the second power supply equipment communication controller receives a registration request for the corresponding electric vehicle communication controller from the electric vehicle communication controller, the registration request; (h) transmitting, by the second power supply equipment communication controller, to the second distributed mobility manager a response message informing that the electric vehicle communication controller has been registered; (i) transmitting, by the second distributed mobility manager, to the first distributed mobility manager a message informing that the power delivery supply segment has been changed to a management area of the second power supply equipment communication controller due to power handover; (j) sending, by the first distributed mobility manager, the change notification of the step (i) to the first power supply communication controller; (k) transmitting, by the first power supply equipment communication controller, to the electric vehicle communication controller a change notification of a power supply equipment communication controller to control power transfer.

The method may further comprise the step of: between the step (i) and the step (j), (i1) controlling, by the first distributed mobility manager, the power supply segment to stop transmitting power to the electric vehicle; or between step (j) and step (k), (j1) controlling, by the first power supply equipment communication controller, the power supply segment to stop power transfer to the electric vehicle.

The method may further comprising the step of: between step (b) and step (c), (b1) controlling, by the second distributed mobility manager, the power supply segment to initiate power transfer to the electric vehicle; or between step (g) and step (h), (g1) controlling, by the second power supply equipment communication controller, the power supply segment to start power transfer to the electric vehicle.

Preferably, the location information of the electric vehicle received in step (a) is information identified by the GPS device of the electric vehicle or information received by the electric vehicle communication controller from the power supply line location information providing unit installed on the power supply line.

Before the step (a), The method may further comprise the steps of: (a01) receiving, by the location mobility manager, when the electric vehicle is located in a non-powered area, location information of the corresponding electric vehicle from the electric vehicle communication controller and registering the location; (a02) receiving, by the location mobility manager, the location of the electric vehicle periodically from the electric vehicle communication controller; (a03) transmitting, by the location mobility manager, when the electric vehicle approaches the power supply area of the first distributed mobility manager and the first power supply equipment communication controller, location registration information of the electric vehicle to the first distributed mobility manager; (a04) transmitting, by the first distributed mobility manager, the location registration information of the electric vehicle to a first power supply equipment communication controller; and, (a05) transmitting, by the first distributed mobility manager, information of a first power supply communication controller to perform charging to the electric vehicle communication controller.

The method may further comprise the step of: between step (a03) and step (a04), (a031) controlling, by the first distributed mobility manager, the power supply segment to initiate power transmission to the electric vehicle; or, after the step (a04), (a06) controlling, by the first power supply equipment communication controller, the power supply segment to start power transfer to the electric vehicle.

Preferably, the location information of the electric vehicle received in the steps (a01) and (a02) is information identified by the GPS device of the electric vehicle.

The method may, before the step (a), further comprise the steps of: (a11) periodically broadcasting, by each distributed mobility manager or power supply equipment communication controller on the power supply line, identification information related to the power supply segment; (a12) receiving, by a receiving device of a specific power supply segment, when identification information of a communication controller of an electric vehicle is transmitted from the communication controller of the electric vehicle that has received the broadcast identification information, the identification information; (a13) estimating, by a distributed mobility manager or a power supply equipment communication controller in charge of the specific power supply segment, signal processing of the identification information of the electric vehicle received in the receiving device of the specific power supply segment; and, (a14) controlling, by the distributed mobility manager or the power supply equipment communication controller in charge of the specific power supply segment, the specific power supply segment to initiate power transfer to the electric vehicle.

According to the present invention, there is provided a distributed control method that enable continuous and stable wireless charging without interruption of charging for a moving electric vehicle by controlling the switching of the power supply segment in real time using a mobile communication system and also provided a distributed communication system for the same.

DETAILED DESCRIPTION OF THE INVENTION

Figure 1:
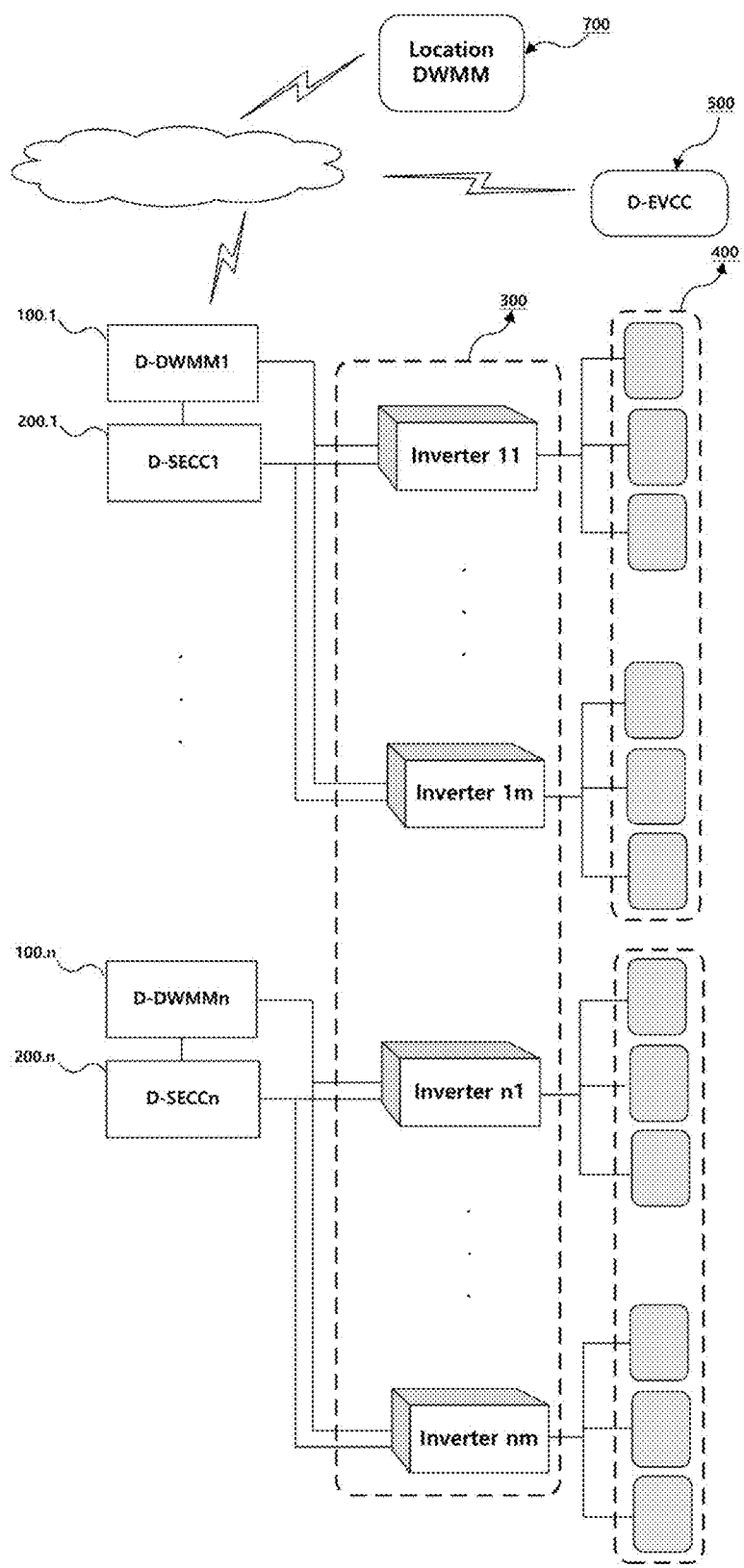
FIG. 1 is a diagram showing a configuration of a distributed control and distributed communication system for wireless charging of an electric vehicle in moving.

Hereinafter, exemplary embodiments of the present invention will be described in detail with reference to the accompanying drawings. Prior to the description of the present invention, it will be noted that the terms and wordings used in the specification and the claims should not be construed as general and lexical meanings, but should be construed as the meanings and concepts that agree with the technical spirits of the present invention, based on the principle stating that the concepts of the terms may be properly defined by the inventor(s) to describe the invention in the best manner. Therefore, because the examples described in the specification and the configurations illustrated in the drawings are merely for the preferred embodiments of the present invention but cannot represent all the technical sprints of the present invention, it should be understood that various equivalents and modifications that may replace them can be present.

FIG. 1 is a diagram showing a configuration of a distributed control and distributed communication system for wireless charging of an electric vehicle in moving.

The overall system that provides wireless charging for an electric vehicle in moving according to the present invention (hereinafter referred to as 'control and distributed communication system for wireless charging of an electric vehicle in moving') includes dynamic wireless charging distributed mobility managers (100.1, . . . 100.n), dynamic wireless charging power supply equipment communication controllers (200.1, . . . 200.n), and a power supply device 400. A dynamic wireless charging electric vehicle communication controller 500 is installed in the electric vehicle.

Figure 2:
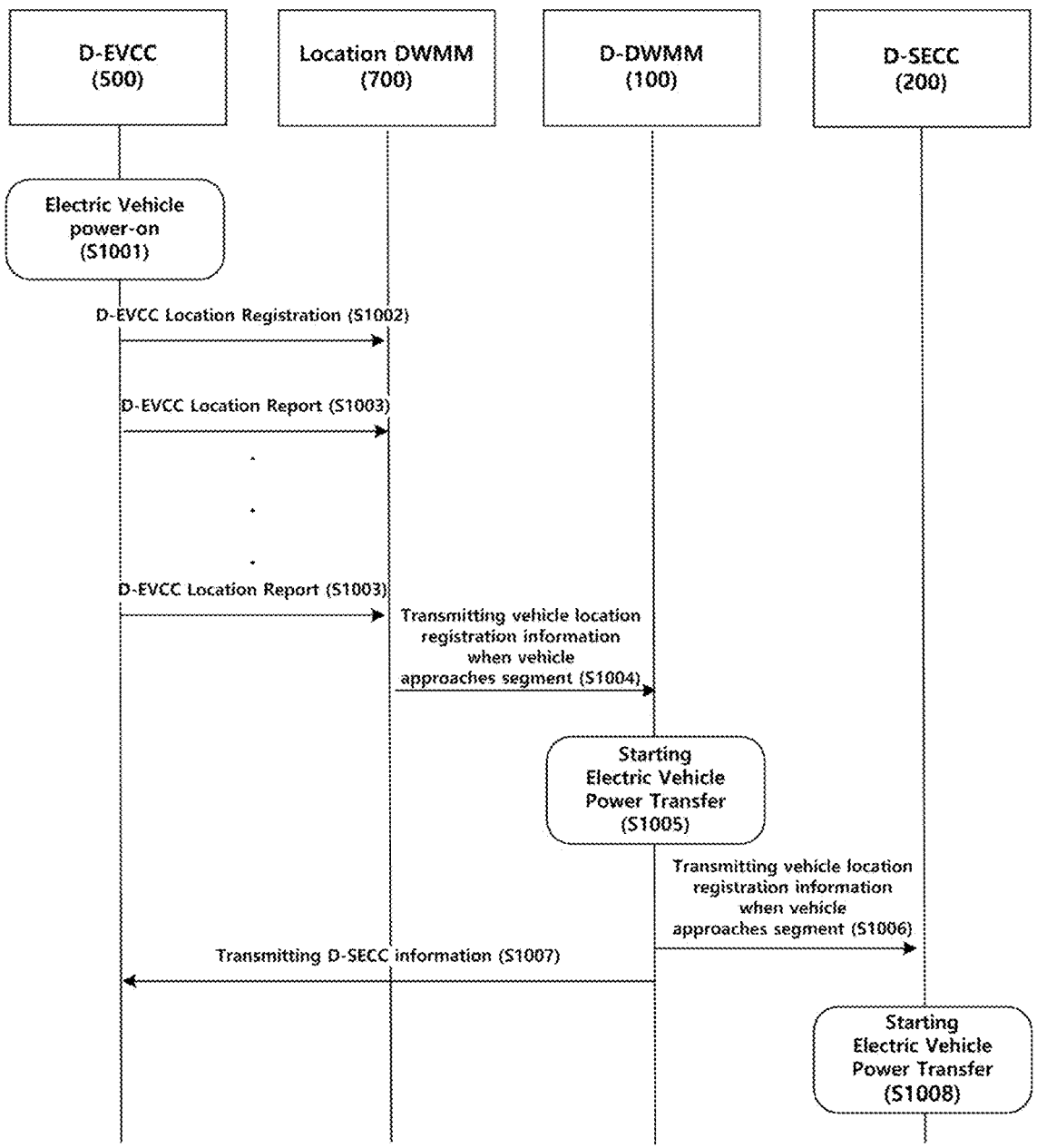
FIG. 2 is a sequence diagram illustrating functions performed by a location mobility manager.

Hereinafter, reference numeral '100' is used to collectively refer to the dynamic wireless charging distributed mobility manager, as shown in FIG. 2. In addition, in order to collectively refer to the dynamic wireless charging power supply equipment communication controller, reference numeral '200' is used, as shown in FIG. 2.

The English abbreviations of each component are summarized as follows:
D-WPT: Dynamic-Wireless Power Transfer
Dynamic Wireless charging distributed mobility manager 100: D-DWMM (Distributed Dynamic WPT Mobility Manager)
Dynamic Wireless charging location mobility manager 700: L-DWMM (Location Dynamic WPT Mobility Manager)
Dynamic Wireless charging power supply equipment communication controller 200: D-SECC (D-WPT Supply Equipment Communication Controller)
Dynamic Wireless charging electric vehicle communication controller 500: D-EVCC (D-WPT Electric Vehicle Communication Controller)

In the following description of the invention, abbreviated names such as distributed mobility manager 100, location mobility manager 700, power supply equipment communication controller 200, electric vehicle communication controller 500, etc. are used for each component, or the above English abbreviations thereof will be used interchangeably.

A distributed control and distributed communication system for wireless charging of an electric vehicle in moving includes a segmented power supply line 400, an inverter 300 that supplies power to each segment of the power supply line 400, D-SECC 200 that controls, when switching between segments and switching according to power handover, the inverter connected to the segments, and D-DWMM 100 that manages power handover according to the movement of electric vehicle. In addition, the distributed control and distributed communication system for wireless charging of an electric vehicle in moving may also include L-DWMM 700 that transmits registration information including D-EVCC 500 information and location information of the electric vehicle to the D-DWMM 100 when the electric vehicle approaches a specific power supply segment.

Power handover management of the D-DWMM 100 may include a function of receiving a power supply start report from the D-SECC 200 that starts power supply according to power handover and storing corresponding information.

Power handover management of the D-DWMM 100 may further include a function of transmitting a power supply stop instruction to the D-SECC 200 that should stop power supply according to power handover.

In addition to the above two functions, power handover management of the D-DWMM 100 may still further include a function of transmitting to the D-SECC 200 to start power supply according to power handover a message to register a dynamic wireless charging electric vehicle communication controller (hereinafter referred to as 'electric vehicle communication controller') of an electric vehicle to be supplied with power.

A sequence including the aforementioned D-DWMM 100 will be described later in detail with reference to the respective drawings.

The D-DWMM 100 and the D-SECC 200 perform power supply control for an electric vehicle while communicating with the D-EVCC 500 mounted on the vehicle. Since this power supply control is performed over a wide area for each electric vehicle in moving along a power supply line, communication at this time is based on a mobile communication system such as 5G/DSRC wireless communication but not Wi-Fi.

As shown in FIG. 1, the D-DWMM 100 detects the movement of the electric vehicle and manages the segment of the corresponding power supply line 400 to be switched ON/OFF in real time by the D-SECC 200. In FIG. 1, each segment is a section in which each D-SECC 200 controls and performs power supply, and refers to a section of the power supply line 400 connected to each D-SECC 200. In addition, the D-SECC 200 serves to turn ON/OFF the inverter 300 of the corresponding segment in real time in the charging infrastructure. The D-SECC 200 is provided with a power allocator that determines the charging power of a charging vehicle. A D-EVCC 500, a communication module that supports dynamic wireless charging, is installed in the electric vehicle.

FIG. 1 illustrates an embodiment in which the D-DWMM 100 and the D-SECC 200 are linked one-to-one, but the present invention is not limited thereto. A plurality of D-SECC 200 and D-DWMM 100 are installed along a power supply line, respectively, and the interoperation may be performed in various ways. That is, as shown in FIG. 1, the D-DWMM 100 and the D-SECC 200 may be linked one-to-one or one-to-many, and the number of inverters 300 controlled by each D-SECC 200 does not necessarily have to be the same.

Figure 6:
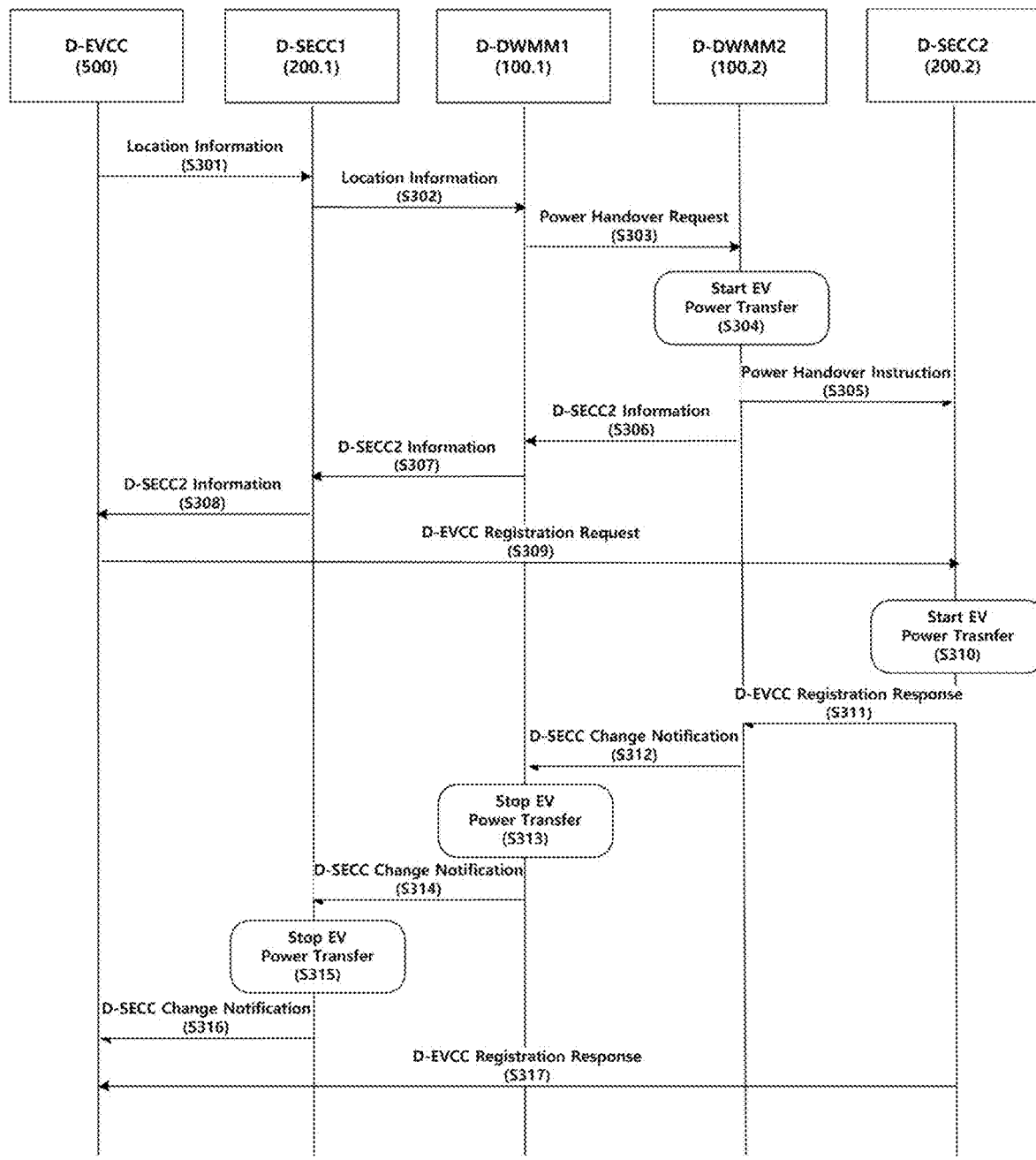
FIG. 6 is a diagram illustrating a sequence in which power handover is performed in the process of providing wireless charging for an electric vehicle in moving.

In addition, in particular, as shown in FIG. 6, the D-SECC 200 controls the inverter 300 to control power transfer to the D-EVCC 500, but in some cases, the D-DWMM 100 may directly control the inverter 300. In FIG. 1, in order to show all these configurations, not only the inverter 300 is connected to each D-SECC 200, but also the D-DWMM 100 is shown to be directly connected to the inverter 300.

The D-DWMM 100 induces the D-SECC 200 to turn ON/OFF the segment of the corresponding power supply line by grasping the movement of the vehicle in real time, and the D-SECC 200 switches ON/OFF the corresponding inverter 300 of the power supply line 400 in real time based on 5G/DSRC communication. A detailed operation will be described in detail below with reference to FIGS. 2 to 8?.

FIG. 2 is a sequence diagram illustrating functions performed by a location mobility manager 700.

FIG. 2 is a sequence in which a position of an electric vehicle entering a power supply line 400 is determined, and power transfer to the corresponding electric vehicle is started in a power supply segment onto which the electric vehicle enters. FIG. 2 shows a sequence in which the initial location of the electric vehicle is determined by the location mobility manager 700 as described above.

After the electric vehicle is power-on (S1001), the location mobility manager (L-DWMM) 700 receives the location information of the electric vehicle from the D-EVCC 500 and registers the location of the electric vehicle (S1002). Thereafter, the D-EVCC 500 continues to report the location of the electric vehicle to the L-DWMM 700 until the electric vehicle in moving enters a power supply segment (S1003), and the L-DWMM 700 continuously tracks the location of the electric vehicle. At this time, the location information transmitted by the D-EVCC 500 and received by the L-DWMM 700 (S1002, S1003) is location information determined by the GPS. Since this time point is before the electric vehicle enters the power supply line, location information cannot be received from the power supply line location information providing unit to be described later in FIG. 8B.

When the electric vehicle approaches a specific power supply segment, the L-DWMM 700 transmits registration information including D-EVCC information and location information of the electric vehicle to the D-DWMM 100 that manages the area of the power supply segment (S1004).

Upon receiving the registration information, the D-DWMM 100 transmits the registration information to the D-SECC 200 controlling the power supply segment (S1006), making the D-EVCC 500 register with the D-SECC 200. The subsequent location tracking of the D-EVCC 500 is performed under the management of the corresponding D-DWMM 100. In addition, the corresponding D-DWMM 100 transmits information of the D-SECC 200 to be charged to the D-EVCC 500 (S1007). The D-SECC 200 starts transmitting power to the electric vehicle by controlling the power supply segment (S1008). At this time, although the D-SECC 200 turns ON/OFF the segment of the corresponding power supply line by switching the inverter 300 ON/OFF as described with reference to FIG. 1, this operation will be briefly expressed as the 'power supply segment control' hereinafter.

Alternatively, when the D-DWMM 100 receives vehicle location registration information from the L-DWMM 700 (S1004), the D-DWMM 100 may also directly control the power supply segment to start transmitting power to the electric vehicle (S1005). In this case, the power supply segment control (S1008) of the D-SECC 200 for starting power transfer to the vehicle is not performed. That is, the power transfer start control for the electric vehicle that has entered the power supply area of the D-DWMM 100 and the D-SECC 200 interoperating therewith may be configured to be performed by the D-DWMM 100 (S1005) or by the D-SECC 200 (S1008).

Meanwhile, a method different from that of FIG. 2 may be adopted as a method of determining the location of the electric vehicle entering the power supply line 400 and initiating power transfer. The steps are described below:

(a11) periodically broadcasting, by each distributed mobility manager or power supply equipment communication controller on the power supply line, identification information related to the power supply segment;

(a12) when the electric vehicle identification information is sent from the electric vehicle communication controller that has received the broadcast identification information, receiving the electric vehicle identification information by the receiving unit of a specific power supply segment;

(a13) estimating, by the distributed mobility manager in charge of the power supply segment or power supply equipment communication controller, the corresponding power supply segment by signal processing the electric vehicle identification information received by the receiving unit of the power supply segment; and, (a14) controlling, by the distributed mobility manager in charge of the power supply segment or the power supply equipment communication controller, the power supply segment to initiate power transfer to the electric vehicle.

Through the above steps, the position of the electric vehicle entering the power supply line 400 is determined and power transfer is started.

Figure 3:
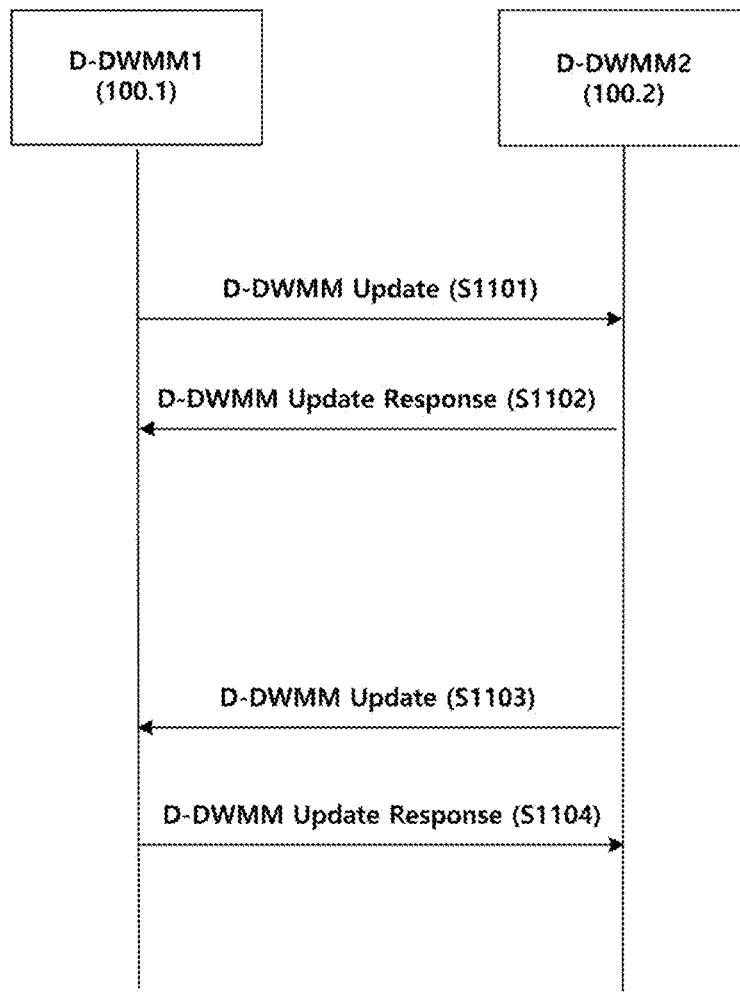
FIG. 3 is a diagram illustrating message transmission and reception between distributed mobility managers.

FIG. 3 is a diagram illustrating message transmission and reception between the distributed mobility managers 100.

In the distributed control and distributed communication system for wireless charging of the electric vehicle in moving, a plurality of distributed mobility managers 100 interoperate with each other (100.1, 100.2). Each mobility manager will be referred to as a distributed mobility manager, that is, D-DWMM1 (Distributed DWMM1) (100.1) and D-DWMM2 (100.2).

Between the adjacent distributed mobility managers (D-DWMM1, D-DWMM2), the electric vehicle communication controller information of the currently charging electric vehicle and the power supply equipment communication controller information that is charging the vehicle are shared and updated with each other (S1101 to S1104). Information that each distributed mobility manager sends to another distributed mobility manager may have the following table form, as an example.

TABLE 1

| D-DWMM # | D-SECC # | Segment # | D-EVCC # | D-EVCC speed, position, power capacity |
| --- | --- | --- | --- | --- |

Figure 4:
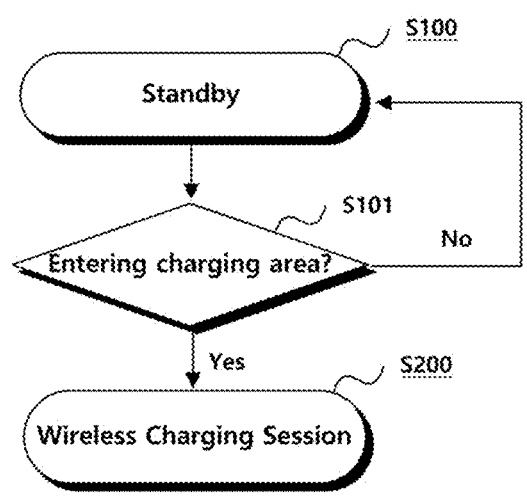
FIG. 4 is a view showing a client-server model in a dynamic wireless charging power supply equipment communication controller in the process of providing wireless charging for an electric vehicle in moving.
Figure 5:
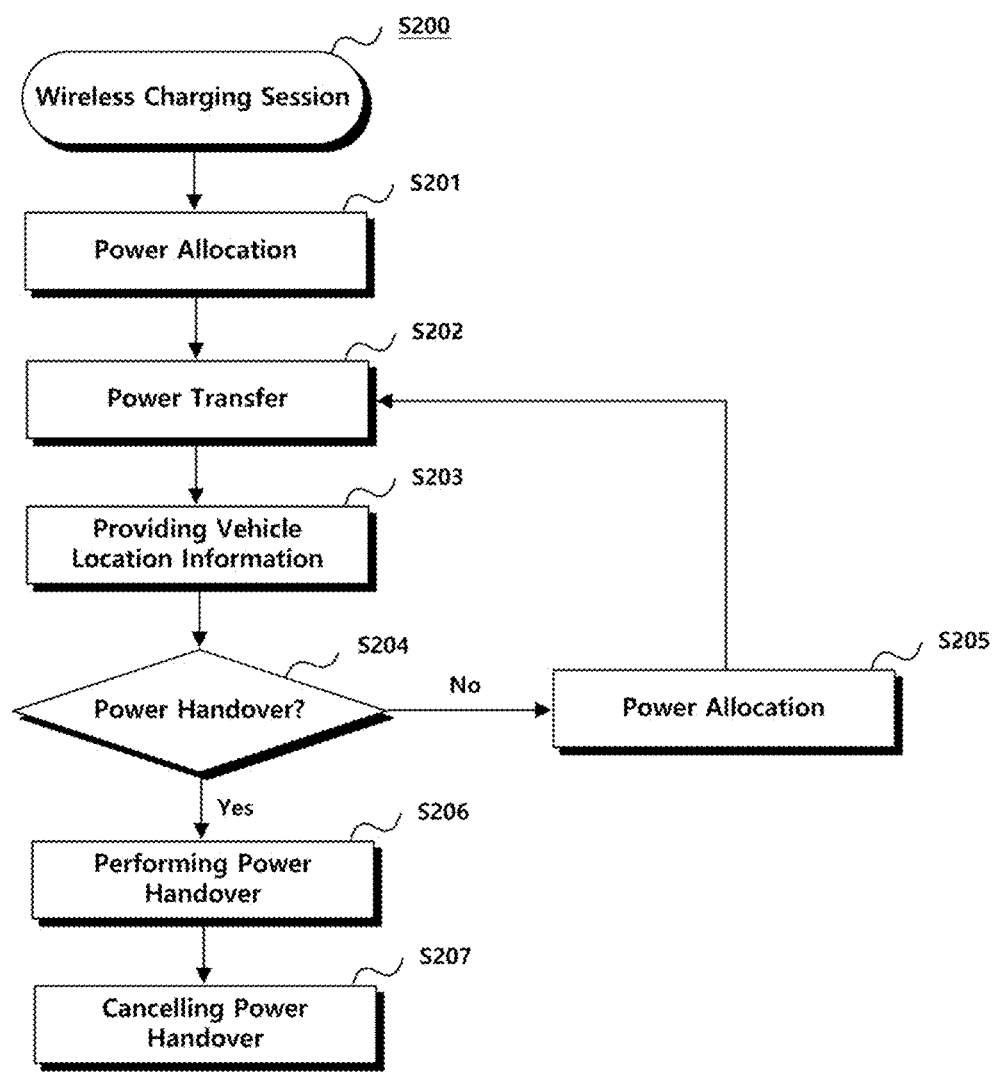
FIG. 5 illustrates a state transition diagram according to the control execution of a dynamic wireless charging power supply equipment communication controller in the process of providing wireless charging for an electric vehicle in moving.

FIG. 4 is a view showing a client-server model in a dynamic wireless charging power supply equipment communication controller in the process of providing wireless charging for an electric vehicle in moving, and FIG. 5 illustrates a state transition diagram according to the control execution of a dynamic wireless charging power supply equipment communication controller in the process of providing wireless charging for an electric vehicle in moving.

Each D-SECC 200 is in the 'standby' state (S100) when the electric vehicle does not enter the power supply line section it controls, that is, the segment. The current location of the electric vehicle is periodically notified to the adjacent D-SECC 200 by the D-EVCC 500 of the moving electric vehicle.

At this time, as described above with reference to FIG. 2, such a notification is made by sending the vehicle location registration information to the D-DWMM 100 corresponding to the location of the D-EVCC 500 by the L-DWMM 700 that has identified the location of the D-EVCC 500 (S1004) and transmitting the vehicle location registration information to the D-SECC 200 corresponding to the location of the vehicle by the D-DWMM 100 (S1005).

Accordingly, when the moving electric vehicle enters the charging area of the adjacent D-SECC 200, the corresponding D-SECC 200 generates a D-WPT session (wireless charging session) by the client-server model (S200). This wireless charging session (S200) is started from the time of the power transfer start (S1007) of the D-SECC (200) in FIG. 2.

In the wireless charging session 200, the D-SECC 200 performs power allocation to the corresponding vehicle (S201). That is, the D-SECC 200 sends a message to the D-EVCC 500 mounted on the vehicle to adjust the pick-up power to a certain extent. If there are multiple vehicles entering the segment, the power to be allocated to each vehicle is determined and a message is sent to the D-EVCC 500 of each vehicle to adjust the pick-up power. The D-SECC 200 turns on the inverter 300 belonging to the corresponding segment to switch to the power supply state. Upon receiving the power allocation message (S201), each D-EVCC 500 adjusts the power of the pick-up device mounted on the vehicle accordingly, and power is transferred wirelessly from the power supply line 400 while passing through the power supply line (S202).

When the D-EVCC 500 of the vehicle detects that it has entered the power supply segment, it periodically transmits its location information wirelessly. The D-SECC 200 that has entered the segment continuously determines this location information (S203), and determines, together with the corresponding D-DWMM, whether the vehicle is at a point where it leaves its own segment and goes to another segment, that is, whether it has reached a power handover stage (S204). If it is not yet the point at which power handover will occur, the D-SECC 200 continuously identifies the situation of the vehicles on it and updates the power allocation (S205) so that each D-EVCC 500 adjusts the pick-up power (S202). At the point at which power handover occurs, power handover is performed (S206) so that the vehicle is supplied with power from the D-DWMM and power supply equipment communication controller 200 of the next segment to which the driving vehicle will enter, and then stops its power supply to release the power handover (S207). Hereinafter, the above-described power handover sequence will be described in more detail with reference to FIG. 6.

FIG. 6 is a diagram illustrating a sequence in which power handover is performed in a process of providing wireless charging for an electric vehicle in moving.

The power handover according to FIG. 6 is an embodiment for performing power handover during the entire wireless charging process according to FIG. 5 and FIG. 7 to be described below.

The D-EVCC 500 of the moving vehicle periodically informs the current vehicle location to the D-SECC1 200.1 closest to the vehicle moving direction (S301), and the D-SECC1 200.1 informs the location of the vehicle to D-DWMM 100.1, which is the distributed mobility manager for the D-SECC1 (S302).

D-DWMM1 100.1, when it is determined that the vehicle is close to the power supply segment area of D-SECC2 200.2, which is the communication controller for the next power supply equipment in the direction of vehicle travel, that is, when it is determined that power handover to D-SECC2 200.2 is required, sends a power handover request to D-DWMM2 100.2, which is a distributed mobility manager for D-SECC2 200.2 (S303). The power handover request message (S303) includes power handover request information, and the power handover request information includes electric vehicle location information received by the D-DWMM1 100.1 from the D-SECC1 200.1 (S302). In response to this, the D-DWMM2 100.2 transmits a power handover instruction message to the D-SECC2 200.2 (S305). The power handover instruction message (S305) includes power handover request information that the D-DWMM2 100.2 received from the D-DWMM1 1000.1 (S303).

D-DWMM2 100.2 sends information of the D-SECC2 200.2, which will receive power handover, to D-DWMM1 100.1 (S306). D-DWMM1 100.1 sends the received information of D-SECC2 200.2 to D-SECC1 200.1 (S307), and D-SECC1 200.1 delivers it to D-EVCC 500 (S308). As such, the D-EVCC 500 periodically provides location information to the D-SECC1 200.1 that is currently transmitting power (S301), and from the D-SECC1 200.1, information of the D-SECC2 200.2, which will perform power transfer next, may be acquired (S308).

The D-EVCC 500 sends a D-EVCC registration request for power handover to the D-SECC2 200.2 (S309), and the D-SECC2 200.2 approves it, and segment switching in which power is applied to a new power supply segment is performed by the control operation of the D-SECC2 200.2 (S310). Afterwards, the D-SECC2 200.2 may send a registration response message to the D-EVCC 500 (S317).

Otherwise, when D-DWMM2 100.2 receives a power handover request from D-DWMM1 100.1 (S303), D-DWMM2 (100.2) may directly control the power supply segment to start power transfer to the vehicle (S304). In this case, the power supply segment control (S310) of the D-SECC2 200.2 for starting power transfer to the vehicle is not performed. That is, the power supply segment control for starting power transfer in the current power supply segment area by power handover may be configured to be performed by the D-DWMM2 100.2 (S304), or by the D-SECC2 200.2 (S310).

Thereafter, the D-SECC2 200.2 sends a registration response to the D-DWMM2 100.2 (S311). D-DWMM2 100.2 sends to D-DWMM1 100.1 a notification that D-SECC to perform power transfer has changed (S312), and D-DWMM1 100.1 sends to D-SECC1 200.1 a D-SECC change notification (S314). At this time, the D-SECC1 200.1 controls the power supply segment to stop power transfer to the vehicle (S315), and transmits a D-SECC change notification to the D-EVCC 500 (S316).

Or, when D-DWMM1 100.1 receives a D-SECC change notification from D-DWMM2 100.2 (S312), D-DWMM1 100.1 may directly control the power supply segment to stop power transfer to the vehicle (S313). In this case, the power supply segment control (S315) of the D-SECC1 200.1 for stopping power transfer to the vehicle is not performed. That is, after starting power transfer in another power supply segment area due to power handover, the control of stopping power transfer in the current power supply segment area may be configured to be performed by the D-DWMM1 100.1 (S313), or may be configured to be performed by the D-SECC1 200.1 (S315).

The location information of the D-EVCC 500 provided to the D-SECC1 200.1 (S301) may be obtained using, for example, GPS.

Alternatively, the RF/MF (magnetic field) signal transmitted from the vehicle equipped with the D-EVCC 500 is received by the power supply line location information provider on the power supply line, and the location information of the vehicle is transmitted to the D-EVCC 500 of the vehicle by magnetic field communication. This will be described later with reference to FIG. 8B.

As shown in the process as described above, during power handover, power supply by D-SECC1 is terminated only after power supply by D-SECC2 to the corresponding vehicle is first started. Accordingly, a section in which power supply overlaps between segments occurs for a short period. This is to ensure that the power supply to the vehicle is not cut off.

Figure 7:
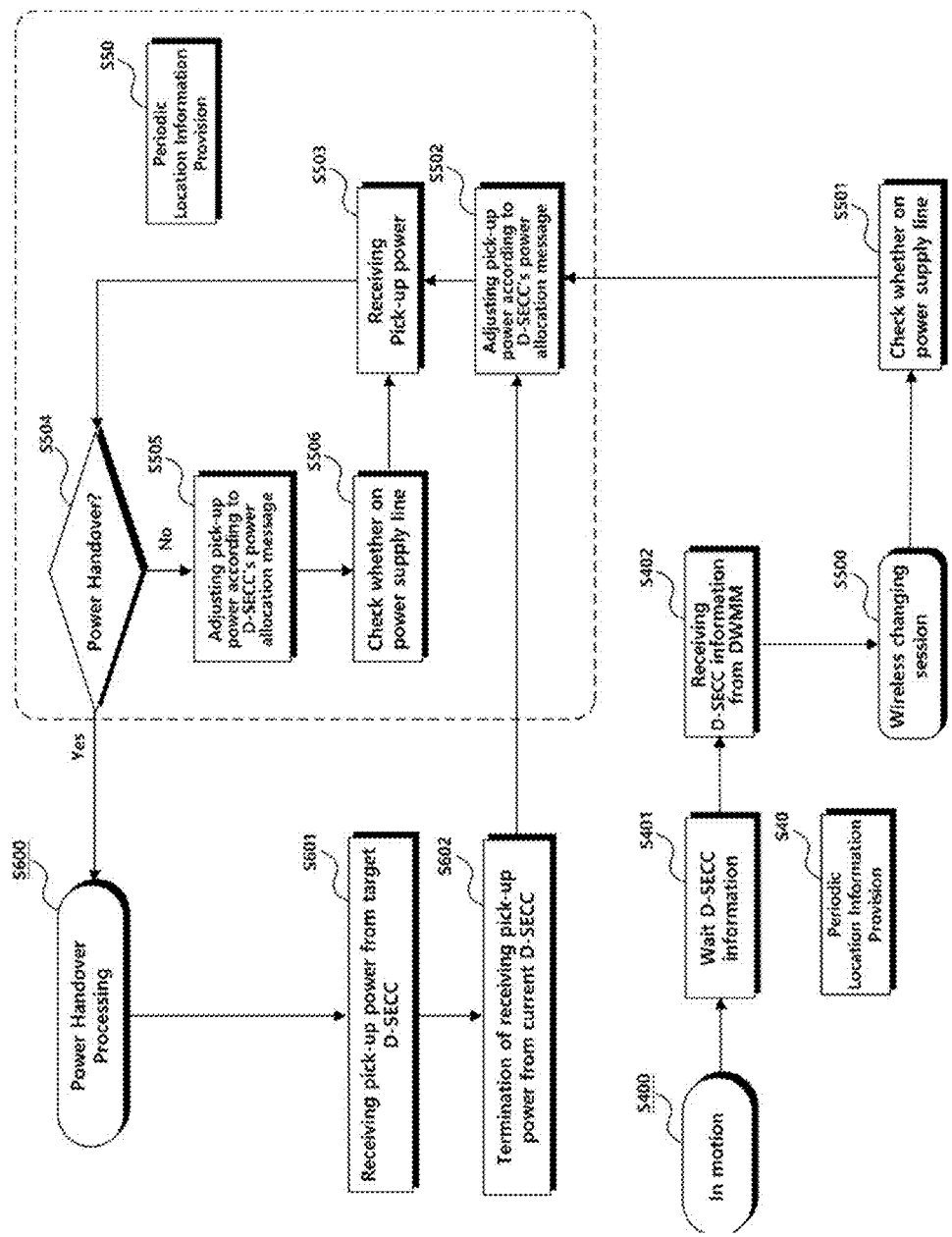
FIG. 7 shows a state transition diagram according to the control operation of a dynamic wireless charging electric vehicle communication controller mounted on an electric vehicle during the process of providing wireless charging for an electric vehicle in moving.

FIG. 7 shows a state transition diagram according to the control operation of a dynamic wireless charging electric vehicle communication controller 500 mounted on an electric vehicle during the process of providing wireless charging for an electric vehicle in moving.

In a vehicle in operation (S400), the D-EVCC 500 periodically transmits its own location information wirelessly to the surroundings even when it does not pass a power supply line (S40). In step S203 of FIG. 5, its own location information is also periodically provided. This is location information provided to the D-SECC 200 for power handover to the next segment during charging when it enters the segment section of the power supply line, and a message is transmitted at a very short interval (e.g., 10 ms). Such location information provision is illustrated in step S50 in FIG. 7 and in step S301 in FIG. 6.

However, step S40 is a location information provision performed for the purpose of finding a power supply segment while driving in a location other than the power supply segment section, that is, while wireless power transfer to the vehicle is not yet performed. Therefore, location information message is transmitted at a much longer interval. Such location information transmission is shown in step S1003 of FIG. 2, and as shown in FIG. 2, the vehicle waits for the D-SECC information from the D-DWMM 100 (S401). This D-SECC is the D-SECC 200 that will transmit power to the vehicle.

The L-DWMM 700 which received such location information provision (S40) transmits the vehicle location registration information to the D-DWMM 100 corresponding to the location of the vehicle (S1004, FIG. 2), and the D-DWMM 100 transmits to the D-EVCC 500 information regarding the D-SECC 200 that manages a power supply segment capable of charging the vehicle (S302, S1006 in FIG. 2). Upon receiving such information, the D-EVCC 500 starts a wireless charging session (S500).

The subsequent process is a state transition sequence in the process of performing power handover according to vehicle movement while wireless charging is performed in a specific D-SECC 200 segment section. FIG. 5 shows a sequence from the viewpoint of the D-SECC 200, and FIG. 7 shows a sequence from the viewpoint of the D-EVCC 500.

That is, upon receiving information regarding D-SECC from the D-DWMM 100 (S402, S1006 in FIG. 2), the D-EVCC 500 checks whether it is on the power supply line (S501). Alignment may be performed by the driver, but may be performed automatically if the vehicle has an automatic alignment function. The D-SECC 200 transmits a power allocation message to the vehicle, and the D-EVCC 500 receives it and adjusts its pick-up power accordingly (S502), and receives the pick-up power wirelessly (S503). The power allocation message has been described in detail with reference to FIG. 5.

In this case, as described above, the location information is provided at a much shorter interval (e.g., ms) than when the location information is provided during the charging standby operation (S40). This location information provision means the same as the location information provision in step S203 of FIG. 5, which is to enable power handover to be performed to the D-SECC 200 of the next segment according to a location according to the movement of the vehicle. in order to make it That is, the current D-SECC1 200.1 continues to determine whether the vehicle is in the power handover position (S504).

If the vehicle is not in the power handover position yet, the D-SECC.1 200.1 continuously transmits a power allocation message to the D-EVCC 500 according to the updated number of vehicles in the current segment. The D-EVCC 500 receives this and adjusts the pick-up power (S505) to receive the pick-up power (S503). In addition, the D-EVCC 500 continuously checks whether the vehicle on which it is mounted is on the power supply line (S506), and if there is an alignment function, the vehicle is aligned to the power supply line.

When the current D-SECC1 200.1 determines that the vehicle is in the power handover position (S504), it starts power handover processing (S600). Such power handover processing has been described in detail with reference to FIG. 6. Accordingly, when the D-EVCC 500 is registered as a new target D-SECC2 200.2, wireless power transfer to the vehicle is started by the target D-SECC2 200.2 (S601, S309 in FIG. 6). In addition, the current D-SECC1 200.1 that received the power supply equipment communication controller change notification from the D-DWMM1 100.1 ends the power transfer (S313, see FIG. 6), and reception of pick-up power from the current D-SECC1 200.1 is terminated (S602).

As described above with reference to FIG. 6, during power handover, power supply of the target power supply device communication controller D-SECC2 200.2 is started (S309) first for the corresponding vehicle, and then the current power supply device communication controller The power supply of D-SECC1 200.1 is terminated (S313). Accordingly, a section in which the power supply overlaps between segments occurs for a short period, which is to ensure that the power supply to the vehicle is not cut off.

Figure 8A:
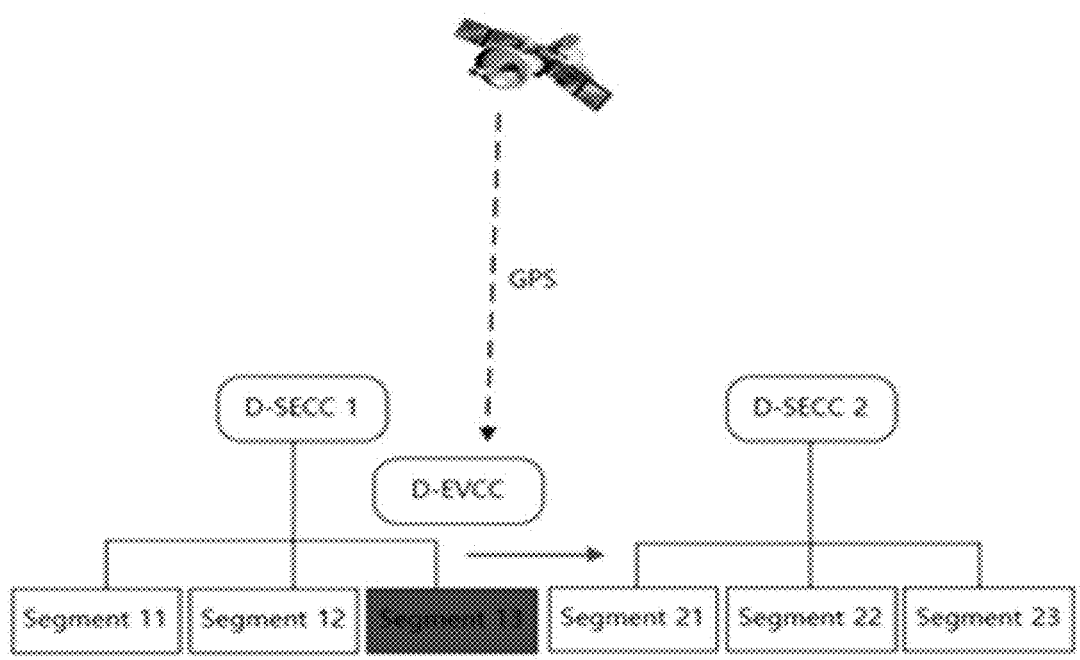
FIG. 8A is a schematic diagram illustrating a vehicle location detection method using a GPS signal.
Figure 8B:
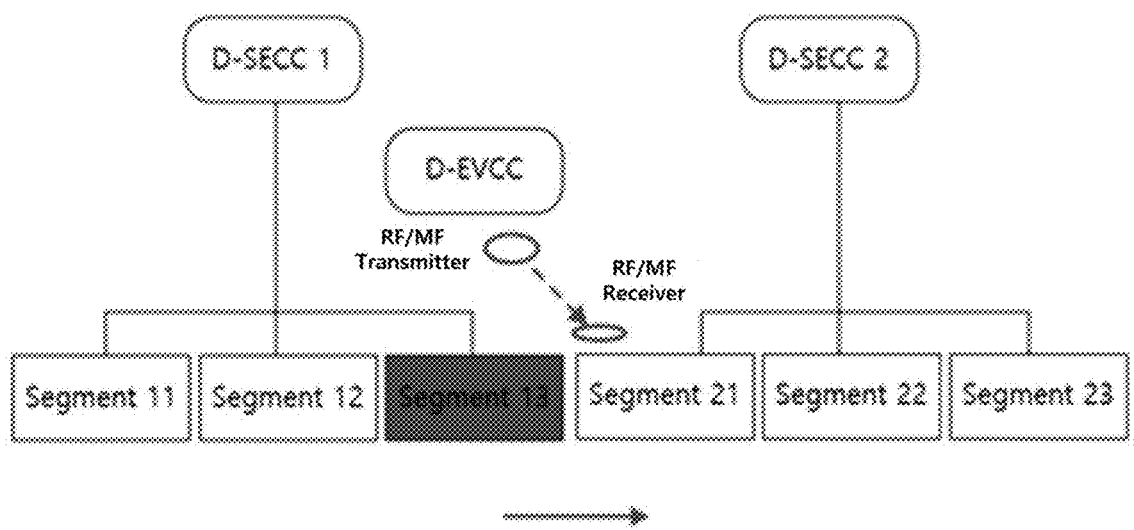
FIG. 8B is a schematic diagram illustrating a vehicle location detection method using an RF/MF (magnetic field) signal.

FIG. 8A is a schematic diagram illustrating a vehicle location detection method using a GPS signal, and FIG. 8B is a schematic diagram illustrating a vehicle location detection method using an RF/MF (magnetic field) signal.

In the case of FIG. 8A, the D-EVCC 500 transmits the location information received from the GPS in the vehicle.

In the case of FIG. 8B, the power supply line location information providing unit receives the RF/MF signal transmitted from the vehicle. The power supply line location information providing unit is a device that is installed on the power supply line to communicate with the D-EVCC 500 of the vehicle. The power supply line location information providing unit transmits the location information of the corresponding vehicle to the D-EVCC 500 of the corresponding vehicle through magnetic field communication. The D-EVCC 500 transmits location information of the corresponding vehicle.

The transmitted location information of the vehicle is received by the L-DWMM 700 as shown in FIG. 2 before the vehicle enters the power supply line (S1003 in FIG. 2). In addition, the location information of the vehicle transmitted in the handover process after entering the power supply line is received by the D-SECC 200 (S203 in FIG. 5, S301 in FIG. 6, S50 in FIG. 7). However, since the L-DWMM 700 receives the vehicle location information before entering the power supply line, only the location information received from the GPS is available for the vehicle location information.

Also, although segment switching for power handover between adjacent D-SECCs is illustrated in FIGS. 8A and 8B, switching between multiple segments within the same D-SECC is also possible.

For the power supply segment in the D-SECC 200, power_on/power_off may be performed at once, or power_on and power_off may be selectively performed in consideration of the moving speed of the vehicle.

What is claimed is:

1. A distributed control and distributed communication system for wireless charging of an electric vehicle in moving, comprising:
   a dynamic wireless charging power supply equipment communication controller (hereinafter, 'power supply equipment communication controller') for communicating with a distributed dynamic wireless charging mobility manager (hereinafter, 'distributed mobility manager') and with a dynamic wireless charging electric vehicle communication controller (hereinafter, 'electric vehicle communication controller') installed in the electric vehicle, and for controlling power transfer from a power supply segment to the electric vehicle by controlling an inverter connected to the power supply segment when switching according to power handover; and,
   a distributed mobility manager for controlling power handover between the power supply equipment communication controller and other power supply equipment communication controllers by interoperating with the power supply equipment communication controller;
   wherein a plurality of the power supply equipment communication controller are installed along the power supply line,
   wherein a plurality of the distributed mobility manager are installed along the power supply line, and
   wherein, between each of the distributed mobility managers, message transmission and reception for power handover is performed.

2. The system of claim 1, wherein the power supply equipment communication controller performs the functions of:
   receiving, when power handover request information is transferred to another power supply equipment communication controller (hereinafter, 'second power supply equipment communication controller') in response to a power handover request, a location information of the electric vehicle from the electric vehicle communication controller mounted on the electric vehicle that is being charged while driving in the power supply segment managed by the power supply equipment communication controller, and providing the location information to the distributed mobility manager interoperating with the power supply equipment communication controller;

providing, when the second power supply equipment communication controller information that has received the power handover request information is received from the distributed mobility manager, the second power supply equipment communication controller information to the electric vehicle communication controller; and, controlling, when a message is received from the distributed mobility manager notifying that the power supply segment has been changed to a management area of the second power supply equipment communication controller by power handover, the power supply segment to stop power transfer to the electric vehicle and transmitting a corresponding change notification to the electric vehicle communication controller.

3. The system of claim 2, wherein, in the case of receiving power handover request information from another power supply equipment communication controller (hereinafter, 'third power supply equipment communication controller') in response to a power handover request, the power supply equipment communication controller further performs the functions of:

receiving a power handover instruction including the power handover request information from a distributed mobility manager interoperating with the power supply equipment communication controller;

receiving a request for registration of the electric vehicle communication controller from the electric vehicle communication controller mounted on the electric vehicle to receive power transfer, and, after approving the request, controlling a power supply segment to start transferring power to the electric vehicle; and, sending a response message informing that the electric vehicle communication controller has been registered to the distributed mobility manager interoperating with the power supply equipment communication controller.

4. The system of claim 1, wherein, when the power supply device communication controller interoperating with the distributed mobility manager transfers power handover request information to another power supply device communication controller (hereinafter, 'second power supply equipment communication controller') interoperating with another distributed mobility manager (hereinafter, 'second distributed mobility manager') by power handover, the distributed mobility manager performs the functions of:

sending, when it is determined that power handover to a power supply segment managed by the second power supply equipment communication controller is required from the location information of the electric vehicle received from the power supply equipment communication controller, the power handover request to the second distributed mobility manager;

receiving, from the second distributed mobility manager, information on the second power supply equipment communication controller that has received the power handover request information, and transmitting the same to the power supply equipment communication controller; and, receiving a message from the second distributed mobility manager notifying that the power supply segment has been changed to a management area of the second power supply equipment communication controller by power handover, controlling the power supply segment to stop power transfer to the electric vehicle, and transmitting the corresponding change notification to the power supply equipment communication controller.

5. The system of claim 4, wherein, when the power supply device communication controller interoperating with the distributed mobility manager receives power handover request information from another power supply device communication controller (hereinafter, 'third power supply equipment communication controller') interoperating with another distributed mobility manager (hereinafter, 'third distributed mobility manager') according to a power handover request, the distributed mobility manager further performs the functions of:

controlling a power supply segment to initiate power transfer to the corresponding electric vehicle upon receiving the power handover request from the third distributed mobility manager;

transmitting a power handover instruction including power handover request information to the power supply equipment communication controller;

transmitting the power supply equipment communication controller information to the third distributed mobility manager; and, transmitting to the third distributed mobility manager, when receiving a response message from the power supply equipment communication controller indicating that the electric vehicle communication controller mounted on the electric vehicle to receive power has been registered, a message informing that the power delivery segment has been changed to the management area of the power supply equipment communication controller due to power handover.

6. The system of claim 1, wherein the distributed mobility manager further includes a function of:

sharing between adjacent distributed mobility managers information on the electric vehicle communication controller of the electric vehicle currently being charged and the communication controller information of the power supply equipment that is charging the electric vehicle.

7. The system of claim 1, further comprising a location mobility manager including the functions of:

registering, after the electric vehicle is powered on, the location of the electric vehicle;

tracking the location of the electric vehicle while moving until the electric vehicle enters a power supply segment; and, transmitting, when the electric vehicle approaches a specific power supply segment, registration information including electric vehicle communication controller information and the location information of the electric vehicle to the distributed mobility manager corresponding to the power supply segment.

8. A method for performing communication for power handover by a dynamic wireless charging power supply equipment communication controller (hereinafter, 'power supply equipment communication controller'), comprising the steps of:

(a) receiving, by the power supply equipment communication controller, location information of an electric vehicle from a dynamic wireless charging electric vehicle communication controller (hereinafter, 'electric vehicle communication controller') mounted on the electric vehicle receiving wireless charging while driving from a power supply segment, and providing the location information to a distributed mobility manager;

(b) providing, in case of receiving other power supply equipment communication controller information (hereinafter 'second power supply equipment communication controller') that has received power handover request information from the distributed mobility manager, the said information to the electric vehicle communication controller; and, (c) controlling, when receiving a message from the distributed mobility manager notifying that the power supply segment has been changed to a management area of the second power supply equipment communication controller due to power handover, the power supply segment to stop power transfer to the electric vehicle, and transmitting a corresponding change notification to the electric vehicle communication controller.

9. The method of claim 8, further comprising the steps of:

(e) receiving, when the power supply equipment communication controller receives power handover request information from another power supply equipment communication controller (hereinafter, 'third power supply equipment communication controller') in response to a power handover request, a power handover instruction including the power handover request information from a distributed mobility manager;

(f) receiving, from the electric vehicle communication controller mounted on the electric vehicle to receive power transfer, a registration request of the corresponding electric vehicle communication controller;

(g) controlling the power supply segment to start power transfer to the corresponding electric vehicle after approving the registration request;

(h) transmitting a response message notifying that the electric vehicle communication controller has been registered to the distributed mobility manager.

10. The method of claim 8, wherein the location information of the electric vehicle received in the step (a) is information identified by the GPS device of the electric vehicle or information received by the electric vehicle communication controller from the power supply line location information providing unit installed on the power supply line.

11. The method of claim 8, further comprising, before the step (a), steps of:

(a01) receiving, when the electric vehicle moves from a non-power supply area to a power supply area of the power supply equipment communication controller and the distributed mobility manager interoperating therewith, location registration information for the electric vehicle from a first distributed mobility manager; and, (a02) controlling the power supply segment to start power transfer to the electric vehicle.

12. A method for controlling, by a distributed dynamic wireless charging mobility manager (hereinafter, 'distributed mobility manager'), power handover information transmission between a power supply equipment communication controller interoperating with the distributed mobility manager and another power supply equipment communication controller, the method comprising the steps of:

(a) receiving, by the distributed mobility manager, location information of an electric vehicle being wirelessly charged from the power supply equipment communication controller;

(b) sending, if it is determined from the location information that it is necessary to perform power handover to a power supply segment managed by another power supply equipment communication controller (hereinafter, 'second power supply equipment communication controller') interoperating with another distributed mobility manager (hereinafter, 'second distributed mobility manager'), a power handover request to the second distributed mobility manager;

(c) receiving, from the second distributed mobility manager, information on the second power supply equipment communication controller that has received the power handover request information;

(d) transmitting information of the second power supply equipment communication controller to the power supply equipment communication controller; and, (e) controlling, when receiving a message from the second distributed mobility manager notifying that the power supply segment is changed to a management area of the second power supply equipment communication controller due to power handover, the power supply segment to stop power transmission to the electric vehicle and transmitting a corresponding change notification to the power supply equipment communication controller.

13. The method of claim 12, further comprising the steps of:

(g) receiving, when the power supply device communication controller interoperating with the distributed mobility manager receives power handover request information from another power supply device communication controller (hereinafter, 'third power supply equipment communication controller') interoperating with another distributed mobility manager (hereinafter, 'third distributed mobility manager') by power handover request, a power handover request including the power handover request information from the third distributed mobility manager;

(h) controlling the power supply segment to start power transfer to the corresponding electric vehicle;

(i) transmitting a power handover instruction including the power handover request information to the power supply equipment communication controller;

(j) transmitting power supply equipment communication controller information to the third distributed mobility manager; and, (k) transmitting to the third distributed mobility manager, when receiving a response message from the power supply equipment communication controller indicating that the electric vehicle communication controller installed in the electric vehicle to receive power is registered, a message informing that the power delivery power segment has been changed to the management area of the power supply equipment communication controller by power handover.

14. The method of claim 12, before the step (a), further comprising the steps of:

(a01) receiving, when the electric vehicle enters a power supply area of the distributed mobility manager and the power supply equipment communication controller from a non-powered area, location registration information for the electric vehicle from a location mobility manager; and, (a02) transmitting the location registration information to the first power supply equipment communication controller.

15. A distributed control and distributed communication method for wireless charging of an electric vehicle in moving, comprising the steps of:

(a) receiving, by a power supply equipment communication controller (hereinafter, 'first power supply equipment communication controller'), location information of the electric vehicle from an electric vehicle communication controller mounted on the electric vehicle in a power supply segment and providing the location information to a distributed mobility manager (hereinafter, 'first distributed mobility manager') interoperating with the first power supply equipment communication controller;

(b) sending, when the first distributed mobility manager determines from the location information that it is necessary to perform power handover to a power supply segment managed by another power supply equipment communication controller (hereinafter, 'second power supply equipment communication controller') interoperating with another distributed mobility manager (hereinafter, 'second distributed mobility manager'), a power handover request to the second distributed mobility manager;

(c) transmitting, by the second distributed mobility manager, a power handover instruction including power handover request information to the second power supply equipment communication controller;

(d) transmitting, by the second distributed mobility manager, the second power supply equipment communication controller information to the first distributed mobility manager;

(e) transmitting, by the first distributed mobility manager, the second power supply device communication controller information to the first power supply device communication controller;

(f) providing, by the first power supply equipment communication controller, the second power supply equipment communication controller information to the electric vehicle communication controller;

(g) approving, when the second power supply equipment communication controller receives a registration request for the corresponding electric vehicle communication controller from the electric vehicle communication controller, the registration request;

(h) transmitting, by the second power supply equipment communication controller, to the second distributed mobility manager a response message informing that the electric vehicle communication controller has been registered;

(i) transmitting, by the second distributed mobility manager, to the first distributed mobility manager a message informing that the power delivery supply segment has been changed to a management area of the second power supply equipment communication controller due to power handover;

(j) sending, by the first distributed mobility manager, the change notification of the step (i) to the first power supply communication controller;

(k) transmitting, by the first power supply equipment communication controller, to the electric vehicle communication controller a change notification of a power supply equipment communication controller to control power transfer.

16. The method of claim 15, further comprising the step of:
between the step (i) and the step (j), (i1) controlling, by the first distributed mobility manager, the power supply segment to stop transmitting power to the electric vehicle; or
between step (j) and step (k), (j1) controlling, by the first power supply equipment communication controller, the power supply segment to stop power transfer to the electric vehicle.

17. The method of claim 15, further comprising the step of:
between step (b) and step (c), (b1) controlling, by the second distributed mobility manager, the power supply segment to initiate power transfer to the electric vehicle; or
between step (g) and step (h), (g1) controlling, by the second power supply equipment communication controller, the power supply segment to start power transfer to the electric vehicle.

18. The method of claim 15, wherein the location information of the electric vehicle received in step (a) is information identified by the GPS device of the electric vehicle or information received by the electric vehicle communication controller from the power supply line location information providing unit installed on the power supply line.

19. The method of claim 15, before the step (a), further comprising the steps of:
(a01) receiving, by the location mobility manager, when the electric vehicle is located in a non-powered area, location information of the corresponding electric vehicle from the electric vehicle communication controller and registering the location;
(a02) receiving, by the location mobility manager, the location of the electric vehicle periodically from the electric vehicle communication controller;
(a03) transmitting, by the location mobility manager, when the electric vehicle approaches the power supply area of the first distributed mobility manager and the first power supply equipment communication controller, location registration information of the electric vehicle to the first distributed mobility manager;
(a04) transmitting, by the first distributed mobility manager, the location registration information of the electric vehicle to a first power supply equipment communication controller; and,
(a05) transmitting, by the first distributed mobility manager, information of a first power supply communication controller to perform charging to the electric vehicle communication controller.

20. The method of claim 19, further comprising the step of:
between step (a03) and step (a04), (a031) controlling, by the first distributed mobility manager, the power supply segment to initiate power transmission to the electric vehicle; or,
after the step (a04), (a06) controlling, by the first power supply equipment communication controller, the power supply segment to start power transfer to the electric vehicle.

21. The method of claim 19, wherein the location information of the electric vehicle received in the steps (a01) and (a02) is information identified by the GPS device of the electric vehicle.

22. The method of claim 15, before the step (a), further comprising the steps of:
(a11) periodically broadcasting, by each distributed mobility manager or power supply equipment communication controller on the power supply line, identification information related to the power supply segment;
(a12) receiving, by a receiving device of a specific power supply segment, when identification information of a communication controller of an electric vehicle is transmitted from the communication controller of the electric vehicle that has received the broadcast identification information, the identification information;

(a13) estimating, by a distributed mobility manager or a power supply equipment communication controller in charge of the specific power supply segment, signal processing of the identification information of the electric vehicle received in the receiving device of the specific power supply segment; and, (a14) controlling, by the distributed mobility manager or the power supply equipment communication controller in charge of the specific power supply segment, the specific power supply segment to initiate power transfer to the electric vehicle.

* * * * *